United States Patent [19]

Condurso

[11] 4,043,072

[45] Aug. 23, 1977

[54] FISH AND LURE RETRIEVER

[76] Inventor: Letterio Dominic Condurso, 1472 Dwight Place, Bronx, N.Y. 10465

[21] Appl. No.: 665,431

[22] Filed: Mar. 10, 1976

[51] Int. Cl.² .............................................. A01K 97/00
[52] U.S. Cl. .................................................... 43/17.2
[58] Field of Search ........................................ 43/17.2

[56] References Cited

U.S. PATENT DOCUMENTS

| | | | |
|---|---|---|---|
| 2,534,790 | 12/1950 | Moore | 43/17.2 |
| 2,608,785 | 9/1952 | Hall | 43/17.2 |
| 2,915,845 | 12/1959 | Hughes | 43/17.2 |
| 3,224,132 | 12/1965 | Frantz | 43/17.2 |

Primary Examiner—Russell R. Kinsey
Assistant Examiner—Daniel J. Leach

[57] ABSTRACT

A fish and lure retriever having a hollow slotted core with a rotatable sleeve partially surrounding the core. A plurality of outwardly extending pointed prongs are located at the rear end of the core and an auxiliary line is attached to the retriever. The retriever is attached to the fishing line by rotating the sleeve to uncover the core slot. The sleeve is then rotated to cover the slot and the retriever is moved down the fishing line. In use, the prongs first pass over a part of the tackle, such as a swivel, and when the auxiliary line is pulled back they catch the swivel so that the tackle and/or fish can be pulled up by the auxiliary line.

5 Claims, 3 Drawing Figures

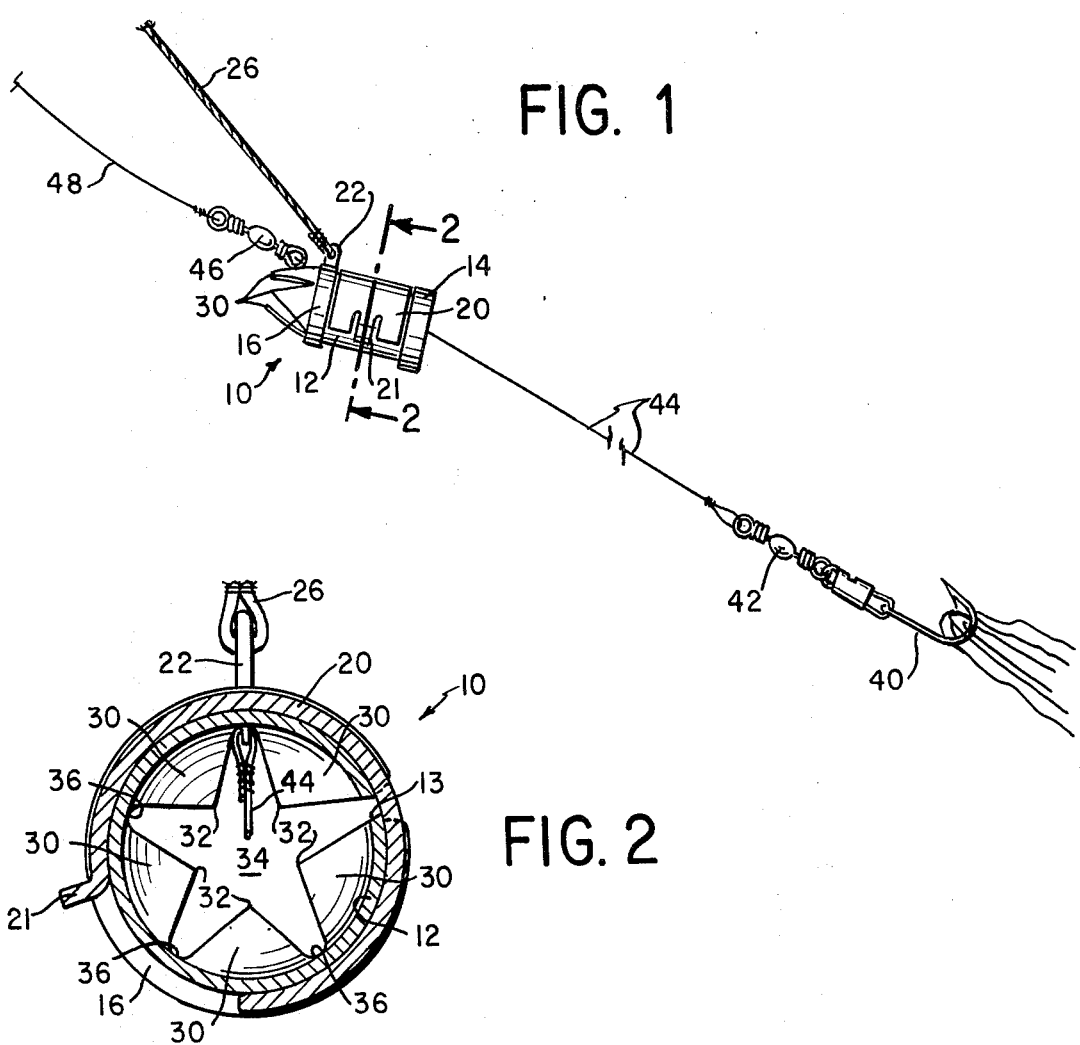
FIG. 1
FIG. 2
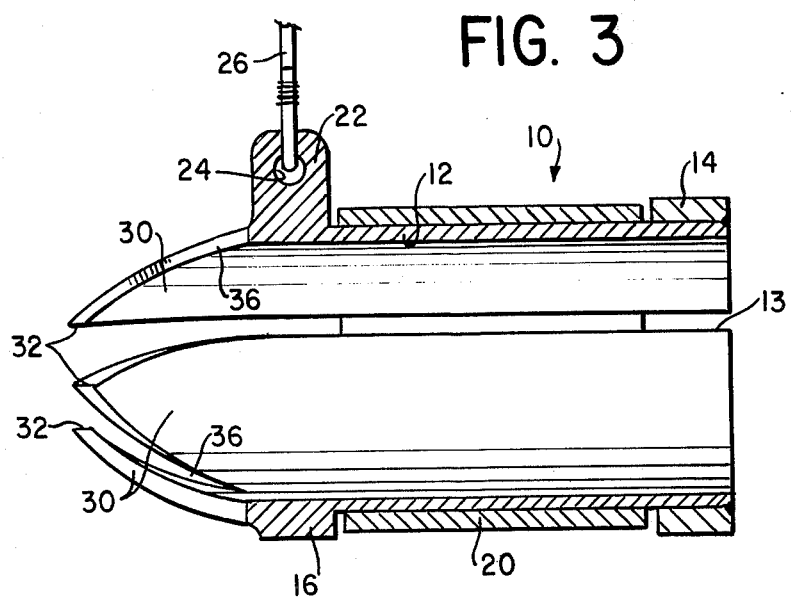
FIG. 3

FISH AND LURE RETRIEVER

In fishing, a problem often arises with respect to pulling up a fish that has been caught which is relatively heavy as compared to the test weight of the line being used. Also, in some instances, it is desirable to retrieve lures which have become snagged on various objects. In both cases, when excessive force is placed on the fishing line, the line breaks. This usually results in a portion of the line as well as the lure (leader and sinker) being lost. In the case where a fish was already on the hook and the line breaks, the fish is also lost.

Heretofore, several lure retrievers have been proposed. These devices are attached to an auxiliary line which has a heavier test weight than the fishing line. The retrievers are slid down along the length of the fishing line after the fish has been caught or the hook has become snagged. The retrievers are constructed so that a pulling force can be applied to the connected auxiliary line and, since this line has a heavier test weight than the fishing line, either the fish can be pulled back or the tackle can be retrieved by the retriever and auxiliary line without breaking the fishing line.

One form of such a lure retriever is shown in Taylor U.S. Pat. No. 2,809,460. The retriever of this patent has a hollow inner sleeve and an outer core, both of which are slotted. The fish line runs through a central core in the inner sleeve and the sleeve is turned relative to the core to hold the fish line. Chains dangle from the retriever for the purpose of disentangling the line. A similar device is shown in U.S. Pat. No. 2,761,235 to Payne. Here, however, the slot for the fishing line is near the outer surface of the inner sleeve and there are no means provided for engaging the fish or lure. The devices of both of these patents allow relatively limited movement from side to side of the fish line and have no provision for catching the retriever to the lure. U.S. Pat. No. 2,915,845 to Hughes attempts to solve the latter problem by using a hollow sleeve with inwardly extending prongs on one end formed on a rotatable inner core. The arrangement of this patent is such that the line is somewhat difficult to thread through the retriever and, because the prongs point inwardly, it is somewhat difficult to pass the device over the swivel connecting the fish line to the leader so as to engage the swivel. Also, the device is somewhat complicated. Other U.S. patents of interest are Boles U.S. Pat. No. 1,982,132, Frederick U.S. Pat. No. 2,826,849 and Western U.S. Pat. No. 3,550,303.

The present invention relates to a novel lure retriever device which is relatively simple in construction and in use and is also highly effective. The retriever comprises a hollow core which has a number of pointed ends which extend outwardly and rearwardly. The core has a longitudinally extending slit through which the fishing line can be passed to the core interior. A rotatable sleeve also having a longitudinal slit is placed over the core and is held thereto against axial movement. In order to use the retrieving device, it is only necessary to align the two slits in the core and the sleeve and to slip the fishing line therethrough. The sleeve is then rotated so that the line is locked within the core. The pointed ends of the core are positioned so that they point away from the water as the retriever is put on to the fish line. It is then slid along the fish line and sinks to the level of the fish. As the auxiliary line attached to the retriever is pulled back, the pointed ends catch a part of the leader or swivel. The fish, or the snagged tackle, then can be pulled up by the auxiliary line.

It is therefore an object of the present invention to provide a fish line retrieving device of simplified construction.

An additional object is to provide a device for retrieving fish and lures which can be placed on the fishing line in a relatively simple manner.

Another object is to provide a fishing lure and retrieving device capable of snagging and holding the tackle in a relatively simple but highly effective manner.

Other objects and advantages of the present invention will become more apparent upon reference to the following specification and annexed drawings, in which:

FIG. 1 is a view showing the retriever and its operation;

FIG. 2 is a section view of the retriever along lines 2—2 of FIG. 1; and

FIG. 3 is a longitudinal view in section.

Referring to the drawings, the retriever 10 is preferably made of metal or other suitable material which has the necessary weight to permit it to sink in the water. The retriever includes a generally cylindrical inner hollow core 12 and a surrounding sleeve 20. The inner diameter of sleeve 20 is slightly greater than the outer diameter of the core 12 so that the sleeve 20 is free to rotate therearound. A first surrounding band 14 is attached to the front end of the core and a second band 16 is attached at a point part way toward the rear, or left end (as shown in FIG. 3) of the retriever. Both bands 14 and 16 can be attached to the sleeve 12 separately or one or both thereof can be formed at the same time as core 12. The bands 14 and 16 can be continuous or, alternatively, they can be segmented. It is only necessary that the bands 14 and 16 provide restricted longitudinal movement for sleeve 20 so that the sleeve is retained on the core.

A mounting post 22 is located at the rear part of the retriever. Post 22 can, for example, be made a part of the rear band 16 or it can be attached separately. The post 22 has a hole 24 therein to accept the auxiliary line 26 which can be fastened to the post by making a knot, or by any other suitable fastening device.

A tab 21 is formed on the sleeve 20 so that the sleeve can be rotated. As seen best in FIG. 2, the sleeve 20 extends for only about 270° around the total circumference of core 12.

The rear part of the core 12 is formed with a number of outwardly extending prongs 30. Five such prongs are illustratively shown although any suitable number can be used. The prongs are each formed with a gentle curve and have a pointed end 32. There is a space 36 between adjacent prongs of a pair leaving an open central area 34.

The operation of the retriever can best be explained by referring to FIG. 1. In FIG. 1 there is shown a fishing tackle gear including the usual hook 40, swivel 42 and leader 44 with swivel mount 46, the latter of which is attached to fishing line 48. The line 48 in turn goes to a fishing reel (not shown). In operation, the hook 40 and the rest of the tackle can either become snagged on an object or, alternatively, the hook has caught a fish. In both cases it becomes necessary to exert a heavy pulling force to retrieve the tackle or to pull up the fish. The leader 44 generally has a heavier test weight than the fishing line 48. Therefore, a greater force can be exerted at or below the connecting swivel 46 than to the fishing line 48.

To use the retriever, assuming the auxiliary line 26 is already attached, the sleeve 20 is rotated so that its open part aligns with the slot 13 in the core 12. The fishing line 48 is then loaded into the core through the aligned openings. The sleeve 20 is then rotated so that the slot 13 is closed, locking the fishing line 48 within the retriever. The retriever 10 is slid down along the line 48 and sinks in the water due to its own weight.

As seen in FIG. 1, the front end of the retriever is a fully opened circular section adjacent the band 14. Because of this, the front end of the retriever can slide easily over the connecting swivel 46 and down along the leader 44. A small amount of force is then exerted on auxiliary line 26 to pull it back up along the leader 44 toward fishing line 48. As seen, the auxiliary line 26 is attached to the retriever at a point offset from its center of mass. Therefore, the retriever will tilt slightly and, as the retriever is pulled upwardly, the swivel 46 will be caught in one of the open spaces 36 between two of the prongs 30. The fisherman then merely has to pull on the auxiliary line 26 to either pull up the fish or to disengage the hook 40 from its entanglement.

It should be understood that the retriever of the present invention is simple in construction and operation. It essentially has only two parts, the core and the sleeve. The bands 14 and 16 can be made as part of the sleeve, or else simple stops used. It is also very easy to thread the fishing line into the core and also to initially pass the core over the swivel connecting the fish line to the leader.

What is claimed is:

1. A fish lure retriever comprising a hollow core having a slot therealong, a sleeve also having a slot rotatable with respect to said core, said slots of said core and sleeve admitting a fishing line into the center of the core when aligned and locking the line in the core when offset from each other, means attached to said retriever for connecting an auxiliary line thereto, said core having an open front end to permit the retriever to move along the fishing line and over connecting tackle and a plurality of prongs formed around the entire periphery of the rear end thereof and converging inwardly toward the center of the core, said slot of said core extending through the area of said prongs, said prongs defining spaced therebetween to catch the connecting tackle as the retriever is pulled upwardly by the auxiliary line.

2. A fish lure as in claim 1 wherein said means for connecting the auxiliary line is located offset from the center of mass of the retriever.

3. A fish lure as in claim 1 wherein said sleeve is on the outside of the core.

4. A fish lure as in claim 3 further comprising an upstanding tab on said sleeve for aid in its rotation.

5. A fish lure retriever as in claim 3 further comprising means for preventing movement of said sleeve along the length of the core.

* * * * *